United States Patent
Chou et al.

(10) Patent No.: US 8,327,039 B2
(45) Date of Patent: Dec. 4, 2012

(54) INTEGRATED DMA PROCESSOR AND PCI EXPRESS SWITCH FOR A HARDWARE-BASED FUNCTIONAL VERIFICATION SYSTEM

(75) Inventors: Ching-Ping Chou, Saratoga, CA (US); Su-Jen Hwang, Los Altos, CA (US); Teng-I Yu, Los Altos, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 679 days.

(21) Appl. No.: 12/541,864

(22) Filed: Aug. 14, 2009

(65) Prior Publication Data

US 2011/0041105 A1  Feb. 17, 2011

(51) Int. Cl.
G06F 13/28 (2006.01)
G06F 3/00 (2006.01)
G06F 5/00 (2006.01)
(52) U.S. Cl. .......................... 710/22; 710/55
(58) Field of Classification Search .............. 710/22, 710/55
See application file for complete search history.

(56) References Cited

U.S. PATENT DOCUMENTS

| 7,484,016 B2 | 1/2009 | Shah et al. |
| 2005/0102125 A1 | 5/2005 | Tseng |
| 2006/0168367 A1 | 7/2006 | Beckett et al. |

OTHER PUBLICATIONS

WO, PCT/US2010/045551—Search Report and Written Opinion, Oct. 5, 2010.

*Primary Examiner* — Chun-Kuan Lee
*Assistant Examiner* — Farley Abad
(74) *Attorney, Agent, or Firm* — Dickstein Shapiro LLP

(57) ABSTRACT

A method and system for facilitating communication between a host system and one or more hardware-based functional verification systems. The one or more hardware-based functional verification systems verify the functionality of electronic circuit designs. A controller switch comprises a host interface connecting to a host system, and a plurality of device ports. Each device port connects to a hardware emulator. The controller switch further comprises a plurality of direct memory access (DMA) engines and a plurality of execution units. An execution unit comprises an instruction cache and memory storing at least one DMA instruction and at least one address for performing a software instruction and a plurality of execution unit registers.

34 Claims, 6 Drawing Sheets

INTEGRATED DMA PROCESSOR AND PCI EXPRESS SWITCH FOR A HARDWARE-BASED FUNCTIONAL VERIFICATION SYSTEM

FIELD

The field of this disclosure relates generally to hardware and software verification of logic circuits and more particularly relates to a method and system for verification and acceleration using an integrated PCI Express switch and DMA processor for a hardware-based functional verification system.

BACKGROUND

One type of electronic design automation (EDA) tool is a hardware-based functional verification system. Examples of a hardware-based functional verification system are hardware logic emulation systems and simulation acceleration systems. Hardware logic emulation systems and simulation acceleration systems are collectively referred to as emulation systems in the subsequent sections. Emulation systems are used to verify the functionalities of electronic circuit designs prior to fabrication as chips or as electronic systems. Such emulation systems are commercially available from various vendors, such as Cadence Design Systems, Inc. headquartered in San Jose, Calif.

Typical emulation systems utilize either interconnected programmable logic chips or interconnected processor chips. Examples of hardware logic emulation systems using programmable logic devices are disclosed in, for example, U.S. Pat. No. 5,109,353, entitled "Apparatus for emulation of electronic hardware system," U.S. Pat. No. 5,036,473 entitled "Method of using electronically reconfigurable logic circuits," U.S. Pat. No. 5,475,830 entitled "Structure and method for providing a reconfigurable emulation circuit without hold time violations," and U.S. Pat. No. 5,960,191 entitled "Emulation system with time-multiplexed interconnect." U.S. Pat. Nos. 5,109,353, 5,036,473, 5,475,830 and 5,960,191 are incorporated herein by reference. Examples of hardware logic emulation systems using processor chips are disclosed in, for example, U.S. Pat. No. 5,551,013 entitled "Multiprocessor for hardware emulation," U.S. Pat. No. 6,035,117 entitled "Tightly coupled emulation processors," and U.S. Pat. No. 6,051,030 entitled "Emulation module having planar array organization." U.S. Pat. Nos. 5,551,013, 6,035,117 and 6,051,030 are incorporated herein by reference.

A design under test (DUT) for emulation is usually provided in the form of register transfer level (RTL) description or gate-level netlists (or "netlists"). It is appreciated that DUTs, electronic circuit designs, user circuit designs, and user designs are exchangeably used in the present application without causing confusion. Using a method called synthesis, gate-level netlists are derived from RTL sources including a hardware description language (HDL), such as Verilog or VHDL. RTL and/or gate-level netlists describe circuit components and electrical interconnections between the circuit components. The circuit components include circuit elements, such as combinatory logic (e.g., gates) and sequential logic (e.g., flip-flops, latches), and memory elements (e.g., SRAM, DRAM) necessary for implementing user designs.

One primary use for hardware logic emulation systems is debugging user designs. Thereby, any functional errors present in the user designs can be identified and resolved prior to fabrication of the user designs in actual silicon. Circuit designers have used hardware emulation systems for many years to perform such debugging because the alternatives, such as simulation, typically are much slower than emulation. Simulation is a software based approach; whereas, for emulation, the user design is compiled with a testbench to form a machine-executable model. Typically, the testbench is represented as a target system (or board) that can directly interact with the user design. The machine-executable model, once compiled, can be executed via a workstation or personal computer.

To facilitate compiling the machine-executable model, the user design usually is provided in the form of a netlist description. The netlist description describes the components of the user design and the electrical interconnections among the components. The components include each circuit element for implementing the user design. Exemplary conventional circuit elements are combinational logic circuit elements (or gates), sequential logic circuit elements, such as flip-flops and latches, and memory elements, such as static random access memory (SRAM) and dynamic random access memory (DRAM). Memory elements that are incorporated into the user design often are referred to as being "design memory systems." The netlist description can be derived from any conventional source, such as a hardware description language (HDL), and is compiled to place the netlist description in a form that can be used by the emulation system.

A wide range of solutions is available for circuit design verification. For the proof of concept, a software model might be enough. For the development of a high quality hardware, advanced verification techniques and processes are required. Oftentimes, it is convenient for a user to peek into signals during a hardware emulation cycle, for example, when the hardware emulation system detects an error while the testbench continues to run on the host system. In a co-simulation environment, a user can interrupt a hardware emulation cycle and trace a source of the error in a debugging process. For faster signal data exchange between the testbench and the user design, high-bandwidth and low latency data channels are required.

A co-simulation environment of a hardware emulation system provides a user with a capability to interrupt hardware emulation at an opportune time to debug the user's design. A host system typically runs a testbench with software variables, breakpoints, and other variables interacting with the user design under test (DUT). The hardware emulation system runs at or near the speed of the real hardware while the simulation speed is orders of magnitude slower. Because of the vast amount of data to be exchanged between the host system and the hardware emulation system for a given emulation cycle, the communication therebetween is critical to provide a meaningful debugging environment.

Various approaches were taken to provide high throughput and low latency data communication between a host system and a hardware emulation system. In one approach, the hardware emulation system uses add-on simulation acceleration (SA) cards to improve the communication speed with the host system. Each SA card performs emulation as well as data communication with the hardware emulation system. In a large and complex configuration, the overloaded processor of the SA card becomes a significant bottleneck for throughput and performance.

Another approach aims to connect multiple emulators using a fiber channel card to improve the throughput of the emulation system. The user design being emulated may be too big and complex to be emulated by a single emulator, and parallel emulation using multiple emulators is performed to yield faster results. However, when resources are shared by multiple emulators, context switching occurs among the multiple emulators, hence the throughput of the system is strictly restricted by the efficiency context switching and data communication among the multiple emulators.

In view of the foregoing, a need exists for a hardware verification system and method that overcomes the aforementioned obstacles and deficiencies of currently available hardware-based functional verification systems.

SUMMARY

A method and system for facilitating communication between a host system and one or more hardware-based functional verification systems. The one or more hardware-based functional verification systems verify the functionality of electronic circuit designs. A controller switch comprises a host interface connecting to a host system, and a plurality of device ports. Each device port connects to a hardware emulator. The controller switch further comprises a plurality of direct memory access (DMA) engines and a plurality of execution units. An execution unit comprises an instruction cache and memory storing at least one DMA instruction and at least one address for performing a software instruction and a plurality of execution unit registers.

The above and other preferred features described herein, including various novel details of implementation and combination of elements, will now be more particularly described with reference to the accompanying drawings and pointed out in the claims. It will be understood that the particular methods and circuits are shown by way of illustration only and not as limitations of the claims. As will be understood by those skilled in the art, the principles and features of the teachings herein may be employed in various and numerous embodiments without departing from the scope of the claims.

BRIEF DESCRIPTION OF THE DRAWINGS

The accompanying drawings, which are included as part of the present specification, illustrate presently preferred embodiment and together with the general description given above and the detailed description of the preferred embodiment given below serve to explain and teach the principles described herein.

Figure 1:
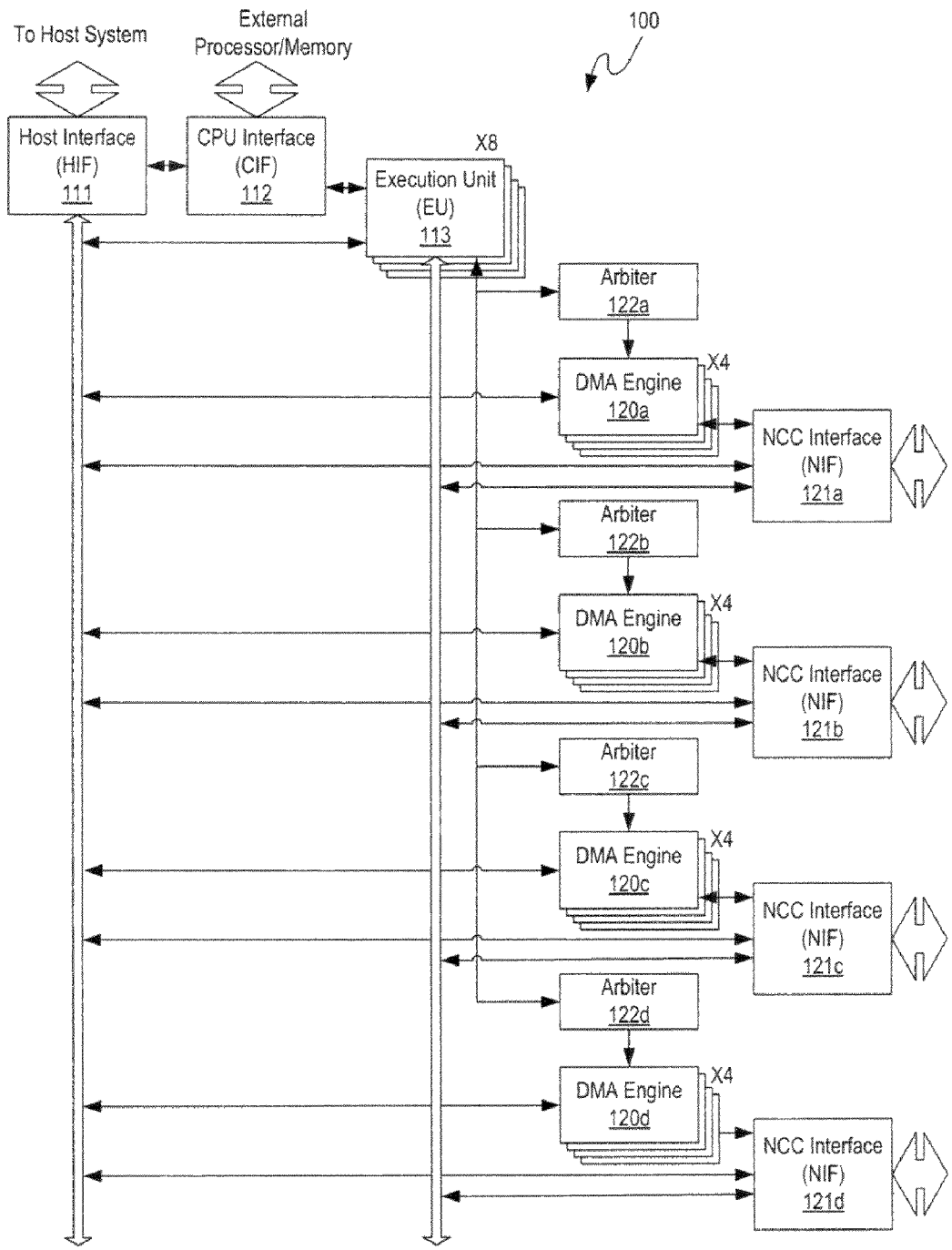
FIG. 1 illustrates a functional block diagram of an exemplary high performance PCI Express switch and DMA processor, according to one embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings disclosed herein and do not limit the scope of the claims.

DETAILED DESCRIPTION

A method and system for facilitating communication between a host system and one or more hardware-based functional verification systems. The one or more hardware-based functional verification systems verify the functionality of electronic circuit designs. A controller switch comprises a host interface connecting to a host system, and a plurality of device ports. Each device port connects to a hardware emulator. The controller switch further comprises a plurality of direct memory access (DMA) engines and a plurality of execution units. An execution unit comprises an instruction cache and memory storing at least one DMA instruction and at least one address for performing a software instruction and a plurality of execution unit registers.

In the following description, for purposes of explanation only, specific nomenclature is set forth to provide a thorough understanding. However, it will be apparent to one skilled in the art that these specific details are not required to practice the concepts described herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The above and other preferred features described herein, including various novel details of implementation and combination of elements, will now be more particularly described with reference to the accompanying drawings and pointed out in the claims. It will be understood that the particular methods and circuits are shown by way of illustration only and not as limitations of the claims. As will be understood by those skilled in the art, the principles and features of the teachings herein may be employed in various and numerous embodiments without departing from the scope of the claims.

FIG. 1 illustrates a functional block diagram of an exemplary PCI Express switch and DMA processor, according to one embodiment. PCI Express switch and DMA processor 100, interchangeably referred to as controller switch 100 or controller 100 in short throughout the specification, has a four-lane PCI Express interface that provides 10 Gbps throughput and less than 1 micro second device-to-device transfer latency. Parallel pipelined Direct Memory Access (DMA) engines 120 are integrated with execution units 113 to best utilize the bandwidth of the PCI Express bus. According to one embodiment, controller switch 100 has five PCI Express ports including one host port and four network controller card (NCC) ports. A hardware emulator may accept multiple network controller cards connected to NCC interface ports 121. Each network controller card may have a PCI Express port of a fiber channel card. The host port is dedicated for communication with a host system via host interface 111, and the four NCC ports connect to four hardware emulator modules via network interface 121 over a optical fiber channel, which is different from the optional fiber channel card. According to one embodiment, each NCC connected to an NCC port may become another PCI Express root, each NCC port of switch-controller 100 may also become a non-transparent upstream bridge. The host port may also be a non-transparent upstream bridge that connects to the system host as an endpoint.

Controller switch 100 may contain various numbers of internal components. For example, controller switch 100 contains 8 execution units 113, 16 arbiters 122 and 16 DMA engines 120 in a 4 by 4 configuration, and four NCC interface ports 121. It is expressly understood that the number of components may vary depending on the configuration of controller switch 100 and may be optimized for the required performance and cost.

Execution unit 113 receives and processes instructions from a host system or an external CPU. The instructions may be generated from an application software running on the host system or the external CPU. According to one embodiment, the instructions is received in a first in/first out (FIFO) buffer such that received instructions are processed on a first-come, first serve basis. An instruction in the FIFO buffer is first served by I/O control 311 that makes a request to a DMA engine 120 to start a PCI Express transaction according to the instruction.

According to one embodiment, execution unit 113 synchronizes NCC events and signals running on the application software and the signals controlled by execution unit 113 using predefined instructions. NCC events and signals may be generated from an application software on a host system. Examples of NCC events and signals are DMA done, evaluation for a time step complete, emulator stop, DUT assertion break, and other application specific events.

According to one embodiment, execution unit 113 receives the following instructions from the host system:
Load: load host system memory and load to instruction cache and 312 of the execution unit 113;
Store: store instruction cache and memory 312, registers 21-317, status register 337 to host system memory;
Read: read from hardware emulator to host system memory
Write: write host system memory to the hardware emulator;
Sync: wait for all target conditions to evaluate to be true;
Wait: wait for a target condition to evaluate to be true;
Stop: stop instruction;
Run: load instruction(s) from host system memory to instruction cache and memory 312 and execute the instruction(s) with a specified length;
Rerun: execute instruction(s) already in the instruction cache and memory 312 without loading from the host system and reuse with a specified length);
Runi: execute instruction(s) stored in instruction cache and memory 312 start at a specified program counter;
Conti: continue executing instruction(s) from the last stopped program counter;
Nop: no operation;
Halt: stop execution of Stop/Run/Rerun/Runi/Conti. The instruction may be resumed by Conti instruction or upon asserting a signal.

According to one embodiment, users can define actions that execution unit 113 can execute. Those user-defined actions may be stored in a table of signal handler 336 for easy access. Examples of user-defined actions are break, pause or resume execution of instructions or generate interrupt to the host.

According to one embodiment, each instruction unit 113 has a dedicated connection to an arbiter 122 via DMA register and monitor (DRQ) 340. After receiving an instruction from a host system, execution unit 113 determines which DMA engine 120 to use to communicate a designated hardware emulator specified in the instruction fields. Execution unit generates DMA request(s) to execute the instruction from the host system, retrieves parameters from memory and registers 312-317 (e.g., source address, destination address, length), and write those parameters into DRQ 340. Arbiters 122 read the DMA request(s) with address and length information from DRQ 340 and assigns the DMA request(s) to a proper DMA engine 120 to carry on the data transfer.

In each DMA instruction, there is a field to select which NCC port 121 to read or write. However, a DMA instruction does not specify which DMA engine 120 to access the NCC port 121, and a DMA engine 120 available to process the DMA instruction is assigned by execution unit 113. For example, execution unit 113 checks the status of all DMA engines 120. In the present example, there are 16 DMA engines 120 in a 4 by 4 matrix configuration. If there is an idle DMA engine 120, the DMA request is assigned thereto. If all DMA engines 120 are busy, execution unit 113 places its DMA instruction queue and waits until a DMA engine 120 becomes available. An engaged DMA engine 120 idling for an extended period of time may be checked if it can temporarily come out of its idle state and perform the new DMA request. The state of the DMA engine may be temporarily stored in cache and memory 312. After performing the DMA request, the DMA engine 120 may be restored to its previous state.

After receiving a request from execution unit 113, DMA engine 120 generates a PCI Express read to access either the host system or a hardware emulator, and wait for a completion packet to be returned.

According to one embodiment, switch-controller 100 is implemented in a field programmable gate array (FPGA). Using a joint test action group (JTAG) interface (not shown), the FPGA may be programmed to configure the sub-modules of switch-controller 100. The JTAG standard is defined in IEEE standard 1149.1: "Standard Test Access Port and Boundary Scan Architectures." Alternatively, an external CPU residing on the controller switch 100 may be used to program the FPGA. Programming the FPGA is beyond the scope of the present subject matter, and various techniques may be used to program the FPGA without deviating from the scope of the present subject matter.

CPU interface 112 provides support for an external processor and an external memory coupled to the external processor. An external processor may be used to provide non-timing critical complex functions such as configuring PCI Express ports or self-diagnostics. An external processor may also configure switch-controller 110 in a more flexible way. For example, the FPGA corresponding to execution unit 113 may be programmed through the external processor. The external memory may store different versions of the FPGA. In another example, the external processor runs a program to access an external source to program the FPGA via a network connection. An external processor may also provide tracing or logging features for debugging or resource management of a hardware emulation without consuming bandwidth of the PCI Express bus interconnecting the host system and the hardware emulators.

Figure 2:
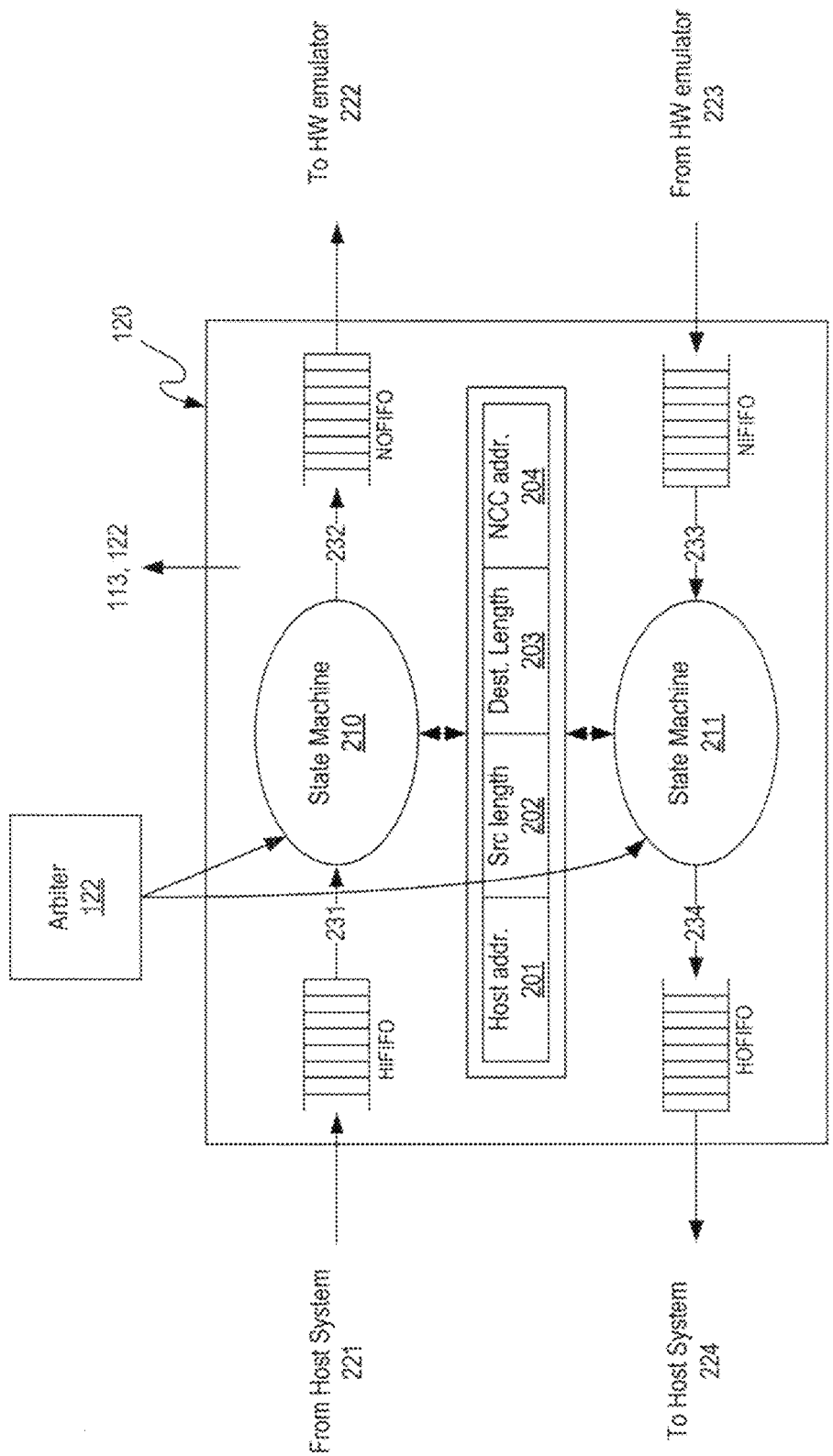
FIG. 2 illustrates an exemplary DMA engine, according to one embodiment.

FIG. 2 illustrates an exemplary DMA engine, according to one embodiment. DMA engine 120 receives and send DMA packets to and from the host system and the hardware emulators according to the DMA requests from execution unit 113.

According to one embodiment, DMA request received from arbiter 122 is processed by two state machines 210 and 211. A DMA read request is processed by DMA engine 120 in the following sequence. First, the DMA read request sets state machine 210 in an 'NCC request' state and writes to NOFIFO to send the request out to the designated hardware emulator via 222. The hardware emulator returns the requested value via 223 along with a read completion packet, which sets state machine 211 in an 'NCC complete' state. State machine 211 sets itself to a 'host request' state and forwards the returned value to the host system via 224.

For a DMA write request, state machine 211 receives the request from arbiter 122, sets its state to 'host request' and sends out the request to host system via 224. The host system returns the requested value to DMA engine 120 via 221 along with a completion packet. State machine 210 sets its state 'host complete', send a write request to the designated hardware emulator via 222, and sets its state to an 'NCC request.'

State machines 210 and 211 store address and other parameters specified in the DMA request in registers 201-204 and reuse them to save software overhead. For example, a DMA read request indicates the start address and length of the DMA read. The address of the DMA is stored in NCC address register 204, and the length of the DMA read is stored in destination length register 203.

According to one embodiment, arbiters 122 and DMA engines 120 are organized in 4 per-port columns. Each column has one arbiter 122 and four DMA engines. Depending on the system requirement, different number of arbiters 122 and DMA engines 120 may be used. Each Arbiter 122 is coupled to each NCC interface 121. According to one embodiment, each arbiter 122 monitors a request buffer per-port. In a DMA read or write instruction, there is a field that specifies which NCC port to use. Execution unit 113 sends the request to the corresponding port and assigns a DMA engine 120 in the column. The DMA channel assignment may be based on a priority schedule or a round robin schedule.

According to one embodiment, there are two levels of priority: simulation acceleration (low, default) and in-circuit emulation (high). Arbiter 122 may grant the next request before the current request is completed. The next request may be started as soon as a DMA engine 120 in that column becomes available between packet transfers of the first request so that there are more than one outstanding requests at a given time. When an arbiter 122 assigns a DMA engine 120, the DMA requester and monitor 340 of the execution unit is notified to monitors the DMA engine 120 until the request completes. DMA engines 120 with no outstanding request are freed up and their status is updated by DMA monitor 340.

According to one embodiment, DMA engines 120 partition into two priority groups. The first group is reserved for an in-circuit emulation only with higher priority, and the second group is for both in-circuit emulation as well as simulation acceleration with lower priority. According to one embodiment, execution unit 113 has a mode register to store its priority.

DMA engine 120 arbitrate which execution unit 112's request to be serviced by which DMA engine 120. According to one embodiment, arbitration is performed based on the priority of the request. When there are more than one request of the same priority, the requests are serviced in the order received. Arbiters 122 use round robin arbitration to choose the next available DMA channel to service the requests.

The DMA channel allocated for the request receives the instruction and the associated parameters, generates a PCI Express request packet (e.g., read, write) and waits until a PCI Express completion packet is received. For a PCI Express write request, the DMA channel forwards the data in the PCI Express write request packet along with the data to the other side. Upon completion of all data for the request, the DMA channel frees itself for the next request.

According to one embodiment, each DMA channel owns a set of registers to keep track of the current DMA address and word count. The initial values are copied from the DMA request parameters. The source and destination addresses and are copied from the DMA request received from arbiter 122. If the DMA request length is too long, for example longer than 1 kByte, the maximum PCI Express read request length, DMA engine 120 needs to cut the DMA request into multiple shorter PCI Express requests. After the first PCI Express read request is sent to the designated hardware emulator, the source address register is changed to the starting point of the next request, and the DMA request length register is reduced by the length of the PCI Express read request. After the completion of each PC Express read request, the host system or the hardware emulator sends back a PCI Express completion packets, which is shorter than the PCI Express read request, for example 128 Bytes. After receiving a PCI Express completion packet, the destination address register, used for a PCI Express write request address, is changed to the starting point of the next completion packet. The destination length register is also reduced by the length of the PCI Express completion packet. These processes continue until the source length and destination length registers are reduced to zero, which indicates the DMA request is completed.

Figure 3:
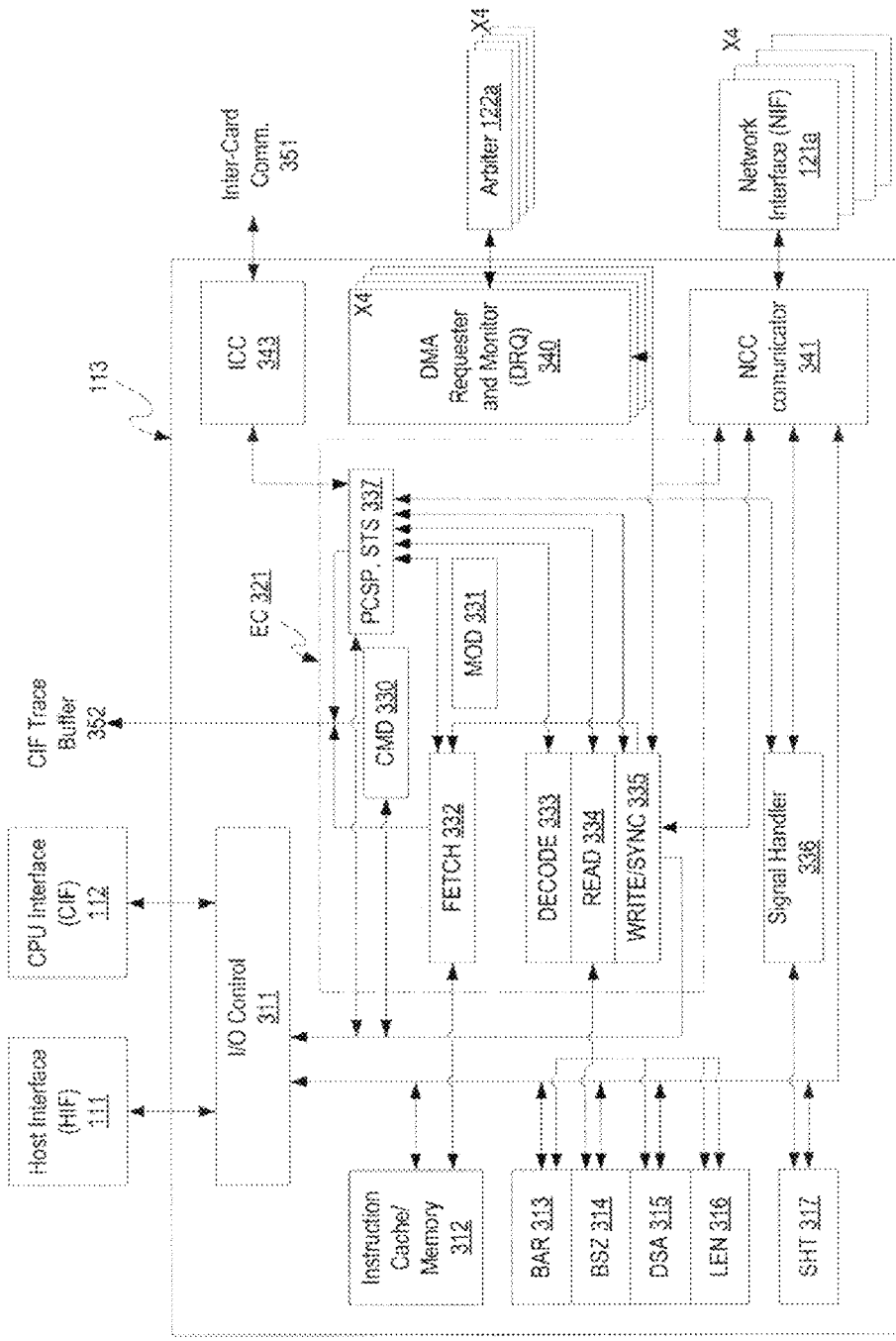
FIG. 3 illustrates a functional block diagram of an exemplary execution unit, according to one embodiment.

FIG. 3 illustrates a functional block diagram of an exemplary execution unit, according to one embodiment. Each execution unit 113 contains the following major sub-modules: I/O control (IOC) 311, execution control (EC) 321, DMA requester and monitor (DRQ) 340, NCC communicator (NC) 341, inter-card communicator (ICC) 343, signal handler (SGH) 336, and register and memory storages 312-317.

I/O Control (IOC)

The primary role of I/O control 311 is arbitrating access request among host interface 111, execution control 321 and signal handler 336. According to one embodiment, I/O control 311 decodes address offset of a sub-module and relays the inbound and outbound packets to the addressed module. Complete control space load/Store DMA. I/O control 311 has a direct access to instruction cache/memory 312, and other execution unit registers 313-317. According to one embodiment, instruction cache/memory 312 is sized to keep frequently used DMA instructions/addresses such that the software does not need to reload them every time the instruction is executed. I/O control 311 also forwards interrupt (e.g., PCI Express in-band signal/message) to host interface 111 or CPU interface 112. Instead of using interrupt lines commonly used for PCI bus, PCI Express bus uses write or message packets to pass special events such as interrupt, power up or down, or hot-plugged. Instruction cache/memory 312 are useful to store parameters for frequently called events.

According to one embodiment, host interface 111 receives interrupt requests from execution units 113 and/or CPU interface 112 and sends in-band interrupt signals or messages to the host system.

The execution pipeline that executes an instruction starts at a desired location in cache/memory 312 until a given length of instructions is executed or a certain condition is met. The instruction specifies which NCC port and which sets of parameter registers to use per each instruction. The execution pipeline fetch these information and send them along with the type of request (e.g., Read, Write, Sync) to DMA requester and monitor 340 at one instruction per cycle (e.g., 125 MHz). When all DMA channels are busy with PCI Express transaction, the execution is paused.

According to one embodiment, an instruction specifies whether to generate an interrupt or write-back the hardware status to the memory of the host system when the instruction is completed. The status write-back to the host memory is advantageous because the execution is performed at the emulation speed, and the overhead for checking the status is assigned to the host system running the software to eliminate any communication or data process overhead that may have caused by the hardware status check if it were performed by hardware emulators.

Since execution unit 113 operates at a much faster speed (e.g., 125 MHz) than the DMA data transfer on PCI Express bus (e.g., 8 B/cycle @ 125 MHz*10/8=10 Gbps), execution unit 113 may issue DMA requests to multiple DMA engines 120. A hardware emulator may contain up to 16 emulator modules to transfer data in parallel. Execution unit 113 may send up to 4 DMA requests to each of the four DMA requesters 340 before the requests in each DMA requester 340 are drained. In addition, each arbiter 122 per port may issue up to 4 DMA requests to the four DMA engines 120 of the port without waiting for the requests in each DMA engine to be completed.

When a host system or an external CPU tries to access the execution unit memory and registers 312-317, host interface 111 decodes upper 50 address bits to generate a module chip select signal and I/O control 311 decodes the lower 14 bits to derive the offset within execution unit 113.

For a write instruction, I/O control 311 receives data with address—whether it is a single location or auto increment—and writes into the corresponding register(s) or memory location(s). For a read instruction, I/O control 311 reads the corresponding register(s) or memory location(s), and returns the value(s) back to the host system via host interface 111 or the external CPU via CPU interface 112 to return a PCI Express completion packet. Handshaking signals may be implemented to support burst transfer with optional wait cycles when the host system or the I/Co control 311 cannot catch up the speed of the packet transfer.

Execution unit DMA requests are invoked by a load/store instruction. For a packet transfer from execution unit 113 to a host system (or an external CPU), I/O control 311 sends a write request with data to the host system via host interface 111. For a packet transfer from the host system to execution unit 113, I/O control 311 sends a read request to host interface 111 and waits host interface 111 to notify the arrival of a read completion packet. I/O control 311 may pass the data to the destination register or memory location with an auto-incrementing address. For DMA between execution unit 113 and an external memory, non-packet pipeline scheme may be used. "Non-packet" refers to the control (e.g., chip-select, read-enable/write-enable, byte-enable etc.) and address signals as well as dedicated signals in parallel with data signals. These signals may change, and are valid per each single data cycle. The values of these signals are arranged in a packet with a header and a packet length. In a DMA packet, only the first data address may be specified, and the following data addresses are automatically incremented per each data until the address reaches the last address as specified by the packet length. In a "pipeline" mode, instead of waiting for a data to pass through the interface that may require multiple cycles, the source may start sending the next data if it may predict the next data's address (e.g., contiguous address, or given next data address in advance). DMA load/store request may block the next request, if applicable, until the completion of the current DMA request.

According to one embodiment, I/O control 311 receives requests from execution control 321 or signal handler 336, and interrupts the host system or the external CPU through host interface 111 and CPU interface 112. If execution control 321 executes a load/store instruction, it asks I/O control 311 to generate a PCI Express read or write request through HIF 111 to the host system. Signals received from NCC communicator 341 or generated internally to execute a pre-defined action are transmitted from signal handler 336 to I/O control 311 to send interrupt signals externally via HIF 111 or CIF 112. CIF 112 may integrate internal signals from all other modules on the switch controller 100, and asks HIF 111 to generate a PCI Express message signaling interrupt (MSI) to the host system.

Execution Control (EC)

Execution control 321 includes major pipelines or state machines for instruction execution. In general, there are four major functional states: 1) instruction fetch 332, 2) instruction decode 333, 3) register read 334, and 4) register write/sync 335. Since the performance bottleneck is typically at DMA engine 120 moving payload data, pipelining may not be required, and a state machine implementation in execution control 321 might be sufficient.

Execution control 321 contains CMD register 330. A write packet from the host system or an external CPU overwrites CMD register 330 and activates the state machine. DMA write to CMD register 330 may be ignored and treated as an NOP instruction to prevent executing the instruction which was mistakenly written to CMD register 330 by a "load" instruction without proper authorization of an application software. Writing CMD register 330 in a "load" instruction is usually followed by a write instruction to other registers, for example, MOD register 331, that do not change during an instruction execution. Typically, software applications do not need to "load" CMD register 330. Software application may want to "load" any/all other registers before directly write a valid instruction, such as "Run" into CMD register 330 to execute with the previously loaded register values.

Instruction fetch refers to the first state (stage) of execution control 321 when a macro or program instructions (e.g., Run, Rerun, Runi, Conti) execute. Program counter (PC) starts at 0 (Run or Rerun), starts at an arbitrary location specified in the instruction field (Runi), or resume from where it stopped (Conti), and fetch instructions one at a time from instruction cache/memory register 312. After each fetch, PC increments by one. The fetched instruction is executed as if it were written to the CMD register 330.

In an 'instruction decode' state, the instruction in CMD register 330 is decoded and a subsequent read, write, or synchronization action is determined.

In a 'register read' state, all register values required by the instruction is obtained. Registers of different roles (e.g., SA and LEN) are implemented in separate RAM blocks so that they can be read simultaneously from the instruction.

In a 'write/synch' state, a DMA read/write request is written to DMA requester and monitor 340, synchronization flags are written to a hardware emulator, load/store DMA request is written to I/O control 311, or interrupt request is sent to I/O control 311. For a sync/wait instruction, the execution may be blocked until the condition is cleared. For example, hardware emulator encodes a 8-bit flag to form 255 exclusive conditions, or use each bit of the flag to represent an inclusive condition. Execution unit 113 sends the flag to the specified hardware emulator and wait until all or any hardware emulator returns the same flag. The conditions may be emulator stop or assertion event or DMA data transfer completion. For a load/store instruction, the execution may be blocked until DMA data transfer completes.

DMA Requester and Monitor (DRQ)

For read and write instructions, execution control 321 sends a DMA request to DMA requester and monitor 340. DMA requester and monitor 340 holds the request in per-port buffer and waits for DMA arbiter 122 to assign an available DMA engine 120 to handle the request. DMA requester and monitor 340 accepts and hold the request per port in its DMA request buffer. Once a request is assigned to a DMA engine 120, DMA requester and monitor 340 hands over the monitoring task to per-port DMA monitor buffer and gets ready to accept a new request. According to one embodiment, the per-port DMA monitor buffer holds up to two active DMA requests in order to achieve the performance of request pipelining and keep better control over pending PCI Express requests. When each DMA request completes, DMA requester and monitor 340 updates status register 237 and free the DMA monitor buffer. When the DMA monitor buffer is full, DMA requester and monitor 340 stall the next request to DMA arbiter 122. If DMA register and monitor (DRQ) 340 is full, execution control 321 stalls at Sync stage.

NCC Communicator (NC)

For a Sync and Wait instruction, execution control 321 sends a write request to NCC communicator 341. NCC communicator 341 forwards the request to network interface 121, NCC communicator 341 also respond to a write request from NCC(s) via network interface 121 for handshaking or signaling. NCC communicator 341 also monitors Sync stage using an internal registers and frees the register when the condition is met to post the completion of the instruction.

Signal Handler

Signal handler 336 monitors execution control 321's exceptions and NCSG signals, and takes actions according to signal handler table (SHT) 317. Signal handler 336 may request I/O control 311 to send an interrupt, set STS flags, pause, resume, stop or abort execution control 321's execution, or ask execution control 321 to run software defined signal service routine (SSR) in cache/memory register 312. Software may overwrite default actions defined in signal handler table 317. In another embodiment, signal service routines (SSR) defined by the application software may be used to synchronize NCCs and the DMA engines 120.

Registers and Memories

All per-user registers and memories are implemented in execution unit 113. Registers and memories are accessed through I/O control 311 during a direct memory map access or load/store control space DMA, and are read in a Read stage. All registers and memories are directly addressable from the host system and an external CPU.

According to one embodiment, instruction cache/memory 312 is implemented as a single continuous-address memory. Run and Rerun instructions always execute instructions start at address 0. Software is responsible to ensure where to load program and functions so that macro instructions (for Run and Rerun) will not overwrite.

Figure 4:
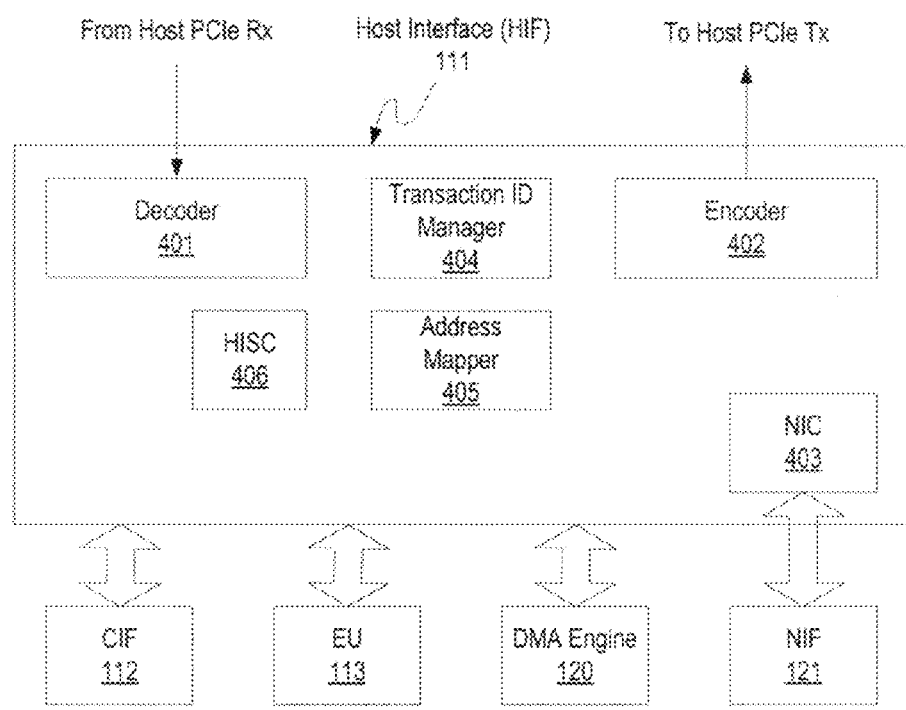
FIG. 4 illustrates a functional block diagram of an exemplary host interface, according to one embodiment.

FIG. 4 illustrates a functional block diagram of an exemplary host interface, according to one embodiment. Host interface 111 receives/transmits PCI Express requests and completion packets from/to a host system. For a write operation, host interface 111 decodes the address of the request packet from the host system using decoder 401. For a read operation, host interface 111 decodes the received packet and identifies the module on the PCI Express bus using the transaction ID contained in packet. Transaction ID manager 404 contains a list of modules connected to the PCI Express bus and route the read packet to the designated module using the address contained in the packet as identified in address mapper 405.

After receiving a packet, host interface 111 determines whether to process the packet or forward the packet to the designated module including CPU interface 112, one of the Execution Units 113, one of the DMA engines 120, or one of the NCC interface 121. The address mapping of the control space and data space and remapping of the PCI Express NCC regions are configurable with variant the base address register and the size register. The internal module address offsets may be hard-coded in the host interface 111.

Host interface internal storage (HISC) 406 provides host backdoor access to PCI Express configuration registers (4 kB) and optionally UHF implementation specific storage (4 kB) such as control/status/test/debug registers and memory spaces through the control space 1 host interface address region.

NCC interface controller (NIC) 403 provides the host system to access NCC interface PCI Express configuration registers (4 kB) and optionally NCC interface implementation specific storage (4 kB) through control space 1 NIF0~3 address region. PCI Express configuration registers may be programmed for loop-back test or hot-plug to an NCC.

Internally, both CPU interface 112 and execution unit 113 support both PCI Express requester and completer functions to host interface 111 and NCC interfaces 121. When the host system accesses an address that is remapped to a NCC or External CPU, host interface 111 forwards the request packet to NCC interface 121 or CPU interface 112, and NCC interface 121 or CPU interface 112 forwards the completion packet to host interface 111. Similar mechanism is provided for requests initiated by External CPU or NCCs.

Figure 5:
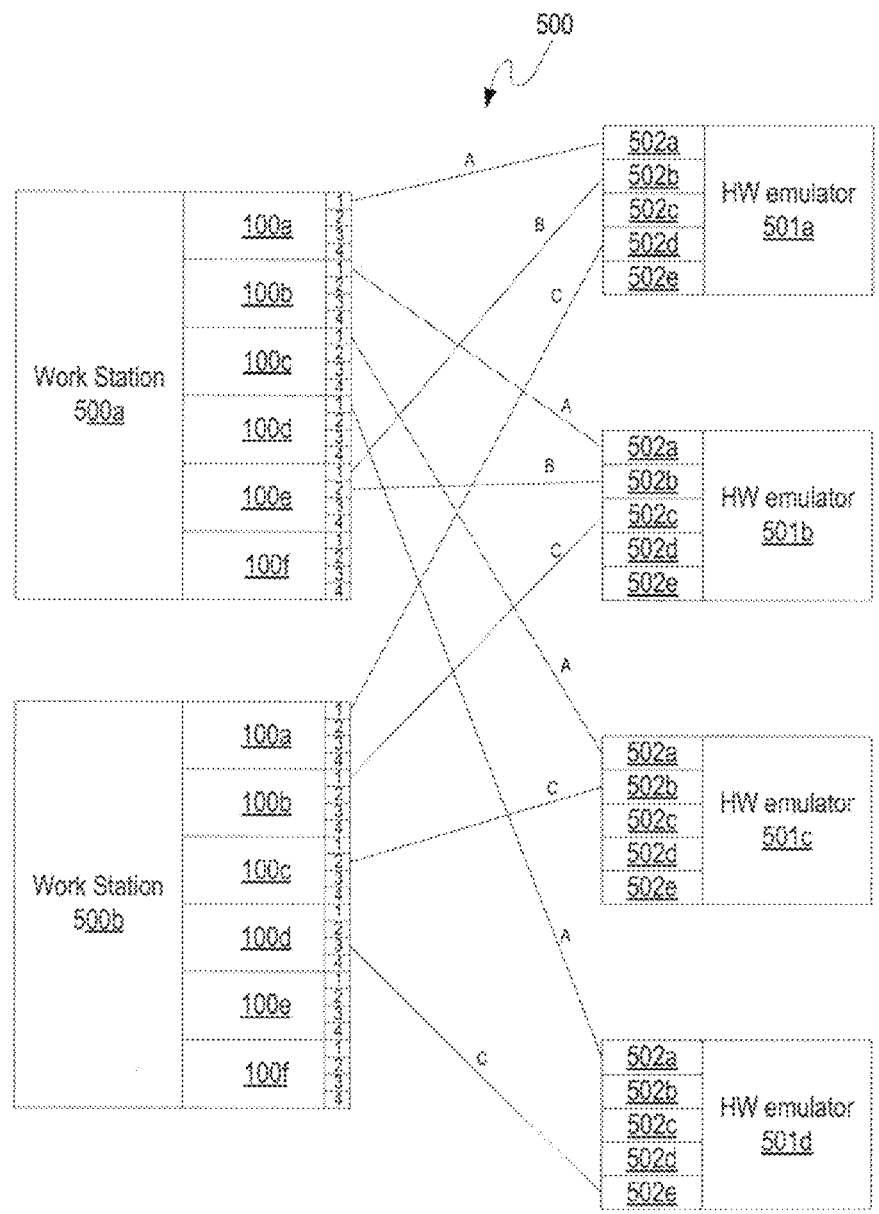
FIG. 5 illustrates an exemplary hardware emulation system comprising multiple work stations and hardware emulators, according to one embodiment.

FIG. 5 illustrates an exemplary hardware emulation system comprising multiple work stations and hardware emulators, according to one embodiment. Each workstation 500a or 500b contains six controller switches 100, and each controller switch has four NCC ports (1-4) to connect to NCC ports 502 of one or more hardware emulators 501. Each hardware emulator 501 has five NCC ports (502a-e). In the present example, each workstation 500 can connect up to 24 hardware NCC ports 502. Although the present example 500 shows that two workstations 500a-b, six controller switches 100a-f per each work station, four NCC ports per each controller switch 100, four hardware emulators 501a-d, five NCC ports 502a-e per hardware emulator 501, it is appreciated that the numbers of each component may vary depending on the system configuration and requirements.

According to one embodiment, hardware-based emulation system offers use models with multi-user capability. Several users can share the resources of a workstation 500 as well as one or more hardware emulators 501a-d. For example, user A runs a simulator on workstation 500a with each port 1 of controller switches 100a-d to run hardware emulators 501a-d. User B runs another simulator on workstation 500a with ports 1 and 2 of controller switch 100e to run both hardware emulator 501a and 501b. According to one embodiment, the configuration of controller switches 100 and hardware modules 502 is automated with an application software running on the workstation.

Figure 6:
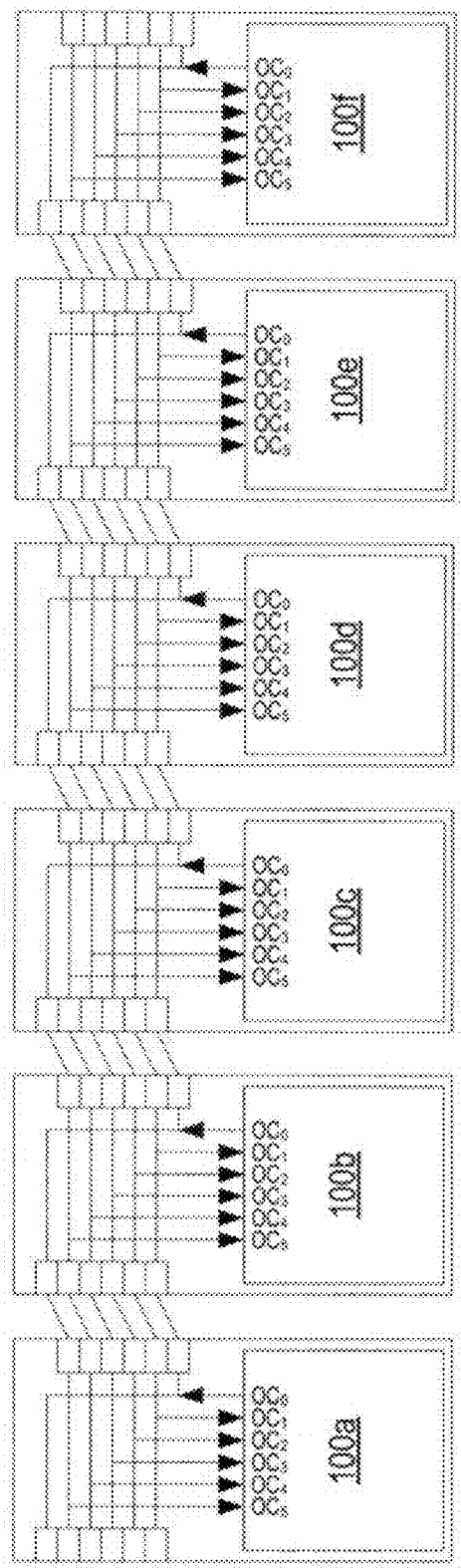
FIG. 6 illustrates an exemplary inter-card communication wiring, according to one embodiment.

FIG. 6 illustrates an exemplary inter-card communication wiring, according to one embodiment. Each control switch 100 sends a message via a broadcasting serial line to other control switch 100. The message may be as simple as a 0 to 1 transition signaling a Sync event, or be encoded for more complex messaging. According to one embodiment, a controller switch 100 may provide five input serial lines to receive messages from up to five other controller switches. Sync and Wait instructions support inter-card synchronization using status register 237. According to one embodiment, inter-card synchronization is used to emulate a large circuit that cannot be implemented in a single card.

According to one embodiment, controller switch 100 contains multiple execution units 113. Each execution unit 113 runs independently in parallel to process DMA instructions. Data transfer over multiple DMA channels, as much needed in a co-simulation cycle, is performed by chained DMA instructions with arbitrary DMA registers, the values of which are preloaded and are reused for repeated data transfer sequence. Instruction cache/memory 312 and DMA registers 313-317 keep frequently used instructions and addresses (e.g., base address register 313, length 314) in each execution unit 113 to minimize software rewriting overhead.

During in-circuit emulation or simulation acceleration, a host system runs a software to control the operation of the hardware emulator(s). The software controls emulation clocks (e.g., start and stop) and provides a user with debugging capability, for example, running the emulator for a time, setting breakpoints, stopping on a defined condition, inspecting pin signals from a hardware emulator, examining circuit and memory states, and resume the emulation or simulation acceleration. Controller switch 100 provides an intelligent packet routing between a host system and the coupled hardware emulator(s) by minimizing various communication overheads so as to provide high throughput, low latency data communication that is otherwise unachievable with hardware emulation systems.

According to one embodiment, hardware status is written into the system memory of the host system (host memory) such that a software checks hardware status instead of polling hardware registers (e.g., status register 237) each time. Since DMA engines 120 are no longer a bottleneck of the entire hardware emulation system due to their multiplicity with registers, there remains enough bandwidth to report hardware status back to the host system. Reporting hardware status back to the host system would ultimately save the PCI Express bandwidth and reduce the register polling latency.

According to one embodiment, interrupts are generated to notify hardware event to the software running on the host system. DMA channel (or engine) selection is automatic, and PCI Express read request to completion latency may be overlapped with other transactions, thus a DMA instruction may partially or totally hidden in a chained DMA sequence For example, when a DMA engine 120 waits for a PCI Express completion to return, another DMA engine may send out a second PCI Express request. Therefore, the second request occurs partially or totally within the first PCI Express request. Consequently, the latency for the second request is hidden totally or partially by the first PCI Express request, thus does not appear in the accumulated latency. In a more specific example, assume that the first request starts at 0 µs, that the waiting time for the first request is 1 µs, and that the data transfer time for the first request is 0.5 µs. Further assume that the second request starts at 0.25 µs and has the same waiting time and data transfer time. The first request finishes at time 1.5 µs and the second request finishes waiting at 0.25+1=1.25 µs, but it cannot transfer data until the first data transfer finishes, so it has to wait until 1.5 µs, then it finishes the data transfer at 1.5+0.5=2 µs. The accumulated latency for 2 requests are 2 µs, not 3 µs. The second waiting time is totally hidden by the first request. In another example, assume that the first request is the same, and the second request starts at 0.8 µs, so it finishes waiting at 1.8 µs. Since the first request is already finished, the second request continues to transfer data and finishes at 1.8+0.5=2.3 µs. In this case, only 3.0−2.3=0.7 µs or 70% of waiting time is partially hidden.

According to one embodiment, a PCI Express write based synchronization mechanism is provided between controller switch 100 and the hardware emulator(s) to eliminate polling. As a result, faster response time is achieved, and the PCI Express bandwidth is saved. Execution units 113, DMA channels and switch are operating in parallel and pipelined so that 10 Gbps data rate is sustained, and the observable latency overhead is minimized. Time-sharing may be required when data is passing through the same PCI Express port. The external PCI Express port over optical fiber only involves change in the communication media, thus additional protocol conversion overhead is not introduced.

According to one embodiment, data transfer flexibility is provided by using an execution unit 113 as an I/O processor. Efficient I/O processing by execution units 113 is facilitated with internal instruction cache/memory 312 and rich set of registers 313-317. Software access overhead is minimized by storing frequently used instructions and addresses in cache/memory 312 and registers 313-317 for executing chained DMA. Status checking overhead also is minimized by hardware status write-back to the host system or by host interrupts. Synchronization overhead between software and hardware emulator is also minimized by hardware status write-back mechanism without requiring status polling.

According to one embodiment, controller switch 100 achieves 10 Gbps DMA throughput and less than 1 micro second latency by multiple parallel pipelined transferring and automatic switching.

Applying standard interface protocol such as PCI Express eliminates the requirement of extra interface conversion logic, reducing the development time and cost. It also provides low level error correction, as a result, offsets the load from application logic. PCI Express bus over optical fiber provides a fast, low noise, and long distance (up to 100 meters) connection.

According to one embodiment, high performance DMA processing and switching architecture may be employed. Instead of relying on a software to control each individual DMA channel, execution units 113 are optimized for I/O processing and work in parallel. Each execution unit 113 has instruction cache/memory 312 and a rich set of DMA registers 313-317. The software determines each execution unit 113 to execute a single instruction, to execute a chain of arbitrary length instructions in instruction cache/memory 312, or to run the instructions fetched from the host system. Typically, for an arbitrary or big block of transfer, a single instruction is written from the host system without preloading cache/memory 312. For frequently used chained transfers, instructions are preloaded from cache/memory 312 and registers 313-317 and are reused many times. For rarely used chained transfers, instructions are kept or prepared immediately prior to the execution in the host memory and automatically pro-fetched prior to the execution.

According to one embodiment, a host system running a software simulator communicates with one or more hardware emulators via control switch 100. Taking advantage of high throughput and short latency of PCI Express bus, software preparation and runtime overhead is minimized, and logic states, memory, and hardware status of hardware emulators are transferred at a much faster rate than conventional hardware emulation systems, for example within micro seconds, through the DMA channels.

According to one embodiment, controller switch 100 may be used over a wide variety of applications with different requirements for data size, configuration, types of devices, etc. Multiple execution units 113 can be employed, each with a dedicated instruction cache/memory 312, running a simple but effective set of instructions, and with rich set of registers 313-317 to reduce the loading time for DMA parameters.

According to one embodiment, status-write back and hardware interrupt features for hardware status check reduce the software overhead for probing DMA completion, yet keep a software to be ware of unexpected hardware events.

Controller switch 100 may be applied in any inter-system high speed communication environment with standard four or more lane PCI Express slots. Execution unit instructions and PCI Express DMA addressing schemes are generic and independent of the application. PCI Express can move any generic data between system devices or main memories to the attached devices at 10 Gbps or faster data rate with short latency in a programmable sequence. Examples are file servers, web servers, databases, parallel computing systems, etc.

A method and system for facilitating communication between a host system and one or more hardware-based emulators verifying electronic circuit designs have been disclosed. Although various embodiments have been described with respect to specific examples and subsystems, it will be apparent to those of ordinary skill in the art that the concepts disclosed herein are not limited to these specific examples or subsystems but extends to other embodiments as well. Included within the scope of these concepts are all of these other embodiments as specified in the claims that follow.

We claim:

1. A controller switch for facilitating communication between a host system and one or more hardware-based functional verification systems, the one or more hardware-based functional verification systems verifying the functionality of electronic circuit designs, the controller switch comprising:
a host interface connecting to the host system;
a plurality of device ports, wherein each device port connects to each hardware-based functional verification system of the one or more hardware-based functional verification systems;
a plurality of direct memory access (DMA) engines; and
a plurality of execution units, wherein one or more of the execution units receives at least one DMA instruction from the host system, comprising:
an instruction cache and memory storing the at least one DMA instruction and at least one address for performing a software instruction; and
a plurality of execution unit registers.

2. The controller switch of claim 1, wherein the plurality of DMA engines and the plurality of device ports are on a PC1 Express bus.

3. The controller switch of claim 1, wherein the controller switch is implemented in a FPGA.

4. The controller switch of claim 1, wherein the plurality of execution units operate independently from each other.

5. The controller switch of claim 1, wherein the DMA instruction is a part of a chained DMA instruction comprising a plurality of DMA instructions.

6. The controller switch of claim 5, wherein the an instruction cache and memory and the plurality of execution unit registers store frequently used values for the chained DMA instruction.

7. The controller switch of claim 5 further comprising a plurality of arbiters, wherein each arbiter of the plurality of arbiters is coupled to one of the plurality of DMA engines.

8. The controller switch of claim 7, wherein the plurality of arbiters receive the DMA instruction and determine a first DMA engine of the plurality of DMA engines to execute the DMA instruction.

9. The controller switch of claim 8, wherein the plurality of arbiters determines the first DMA engine based on a priority schedule.

10. The controller switch of claim 8, wherein the plurality of arbiters determines the first DMA engine based on a round-robin schedule.

11. The controller switch of claim 1 further comprising a CPU interface port, wherein the CPU interface port connects the controller switch to an external CPU.

12. The controller switch of claim 11, wherein the external CPU programs the controller switch via a JTAG interface.

13. The controller switch of claim 1, wherein each execution unit of the plurality of execution units operates a state machine to process the at least one DMA instruction.

14. The controller switch of claim 1 further comprising an inter-card communication interface to connect to another controller switch.

15. The controller switch of claim 1, wherein the host system runs an application software and wherein the application software runs the software instruction to verify the functionality of the electronic circuit designs using the one or more hardware-based functional verification systems.

16. The controller switch of claim 1, wherein a first DMA engine of the plurality of DMA engines processes a first DMA request.

17. The controller switch of claim 16, wherein a second DMA engine of the plurality of DMA engines starts a second DMA request while the first DMA request is not yet completed.

18. A computer-implemented method, comprising:
providing a controller switch for facilitating communication between a host system and one or more hardware-based functional verification systems; and
verifying the functionality of electronic circuit designs using the one or more hardware-based functional verification system,
wherein the controller switch comprises:
a host interface connecting to the host system;
a plurality of device ports, wherein each device port connects to each hardware-based functional verification system of the one or more hardware-based functional verification systems;
a plurality of direct memory access (DMA) engines; and
a plurality of execution units, wherein the execution units receive DMA instructions from the host system, comprising:
an instruction cache and memory storing the at least one DMA instruction and at least one address for performing a software instruction; and
a plurality of execution unit registers.

19. The computer-implemented method of claim 18, wherein the plurality of DMA engines and the plurality of device ports are on a PCI Express bus.

20. The computer-implemented method of claim 18, wherein the controller switch is implemented in a FPGA.

21. The computer-implemented method of claim 18, wherein the plurality of execution units operate independently from each other.

22. The computer-implemented method of claim 18, wherein the DMA instruction is a part of a chained DMA instruction comprising a plurality of DMA instructions.

23. The computer-implemented method of claim 22, wherein the an instruction cache and memory and the plurality of execution unit registers store frequently used values for the chained DMA instruction.

24. The computer-implemented method of claim 22, wherein the controller switch further comprises a plurality of arbiters, wherein each arbiter of the plurality of arbiters is coupled to one of the plurality of DMA engines.

25. The computer-implemented method of claim 24, wherein the plurality of arbiters receive the DMA instruction and determine a first DMA engine of the plurality of DMA engines to execute the DMA instruction.

26. The computer-implemented method of claim 25, wherein the plurality of arbiters determines the first DMA engine based on a priority schedule.

27. The computer-implemented method of claim 25, wherein the plurality of arbiters determines the first DMA engine based on a round-robin schedule.

28. The computer-implemented method of claim 18, wherein the controller switch further comprises a CPU interface port, wherein the CPU interface port connects the controller switch to an external CPU.

29. The computer-implemented method of claim 28, wherein the external CPU programs the controller switch via a JTAG interface.

30. The computer-implemented method of claim 18, wherein each execution unit of the plurality of execution units operates a state machine to process the at least one DMA instruction.

31. The computer-implemented method of claim 18, wherein the controller switch further comprises an inter-card communication interface to connect to another controller switch.

32. The computer-implemented method of claim 18, wherein the host system runs an application software and wherein the application software runs the software instruction to verify the functionality of the electronic circuit designs using the one or more hardware-based functional verification systems.

33. The computer-implemented method of claim 18, wherein a first DMA engine of the plurality of DMA engines processes a first DMA request.

34. The computer-implemented method of claim 33, wherein a second DMA engine of the plurality of DMA engines starts a second DMA request while the first DMA request is not yet completed.

* * * * *